Aug. 27, 1935.　　　　S. P. NEMETH　　　　2,012,768
FLYING APPARATUS
Filed Jan. 16, 1935　　　　2 Sheets-Sheet 1

Inventor
Steffen P. Nemeth,

By Max M. Munk

Attorney

Aug. 27, 1935.  S. P. NEMETH  2,012,768
FLYING APPARATUS
Filed Jan. 16, 1935  2 Sheets-Sheet 2
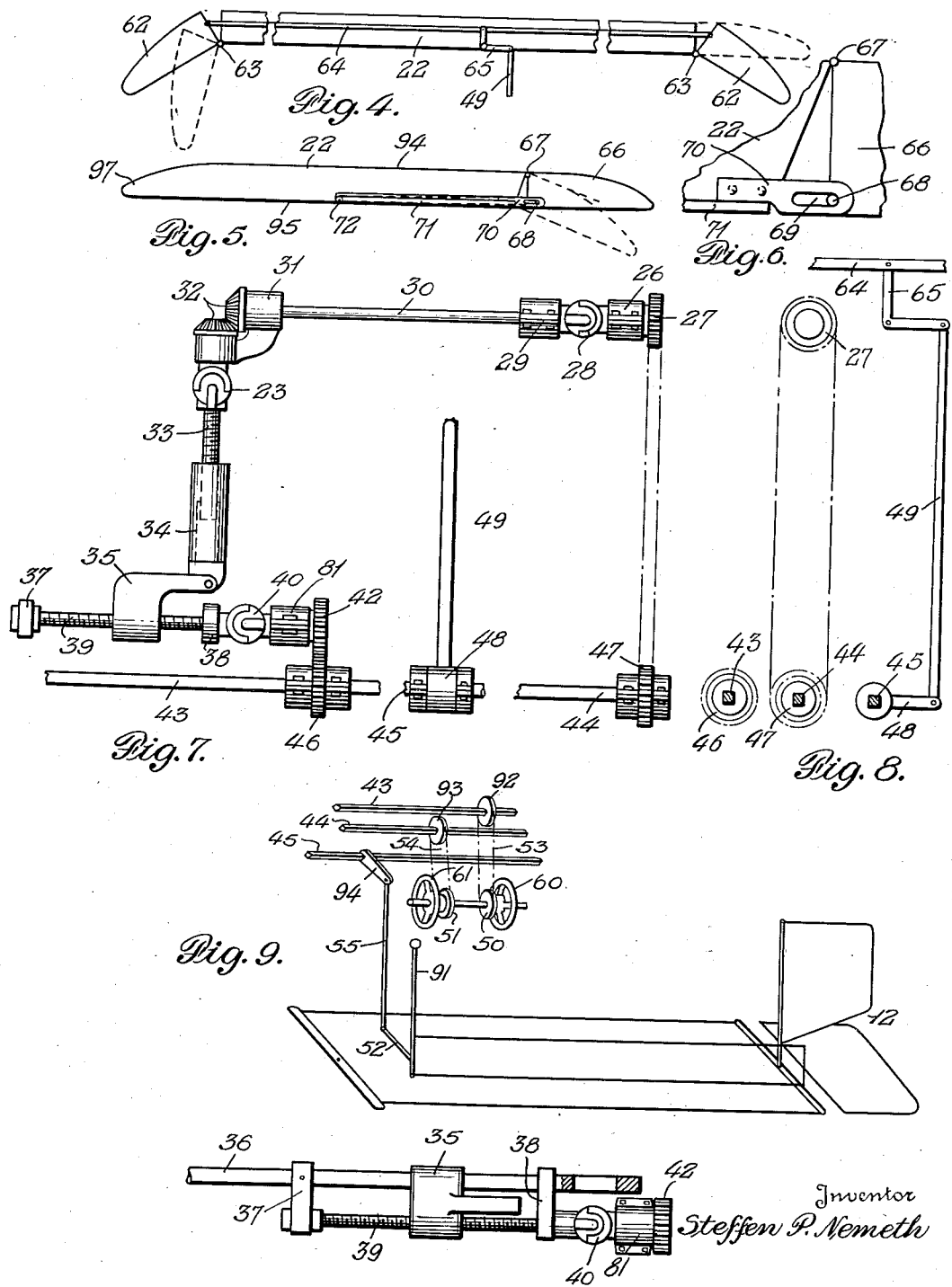

Patented Aug. 27, 1935

2,012,768

UNITED STATES PATENT OFFICE 2,012,768

FLYING APPARATUS

Steffen P. Nemeth, Chicago, Ill.

Application January 16, 1935, Serial No. 2,094

3 Claims. (Cl. 244—11)

This invention relates to flying apparatus in which useful airforces are set up by a pair of airfoils oscillated substantially parallel to the direction of flight. The invention resides in the improved design of these airfoils, and in the manner in which they are driven and their incidence periodically and aperiodically adjusted and controlled, as will be hereinafter described and explained.

It is the broad object of this invention to provide for flying apparatus capable of leaving the ground and starting on a vertical or very steep path, of hovering in the air under its own power, of executing fast flights efficiently and economically, and to glide down without power at a reasonably low velocity.

It is another object of the invention to provide for flying apparatus without a rotating propeller, eliminating thereby the aerodynamic power loss of such propeller, its noise, and the danger associated therewith on the ground.

Another object is to provide in flying apparatus for a pair of oscillating airfoils the incidence of which is changed through a considerable period and gradually during each stroke, whereby their aerodynamic capacity is increased.

A still other object of the invention is to provide for flying apparatus comprising a pair of airfoils oscillated substantially parallel to the direction of flight by a crank and connecting rod mechanism, whereby these airfoils are adjustably linked to the connecting rods driving them, as more particularly described hereinafter.

These and other desirable objects and advantages of the present invention will be illustrated in the accompanying drawings and described in the specification, a preferred embodiment being disclosed by way of illustration only, for, since the underlying principles may be incorporated in other specific devices, it is not intended to be limited to the one here shown, except as such limitations are clearly imposed by the appended claims.

Figure 1:
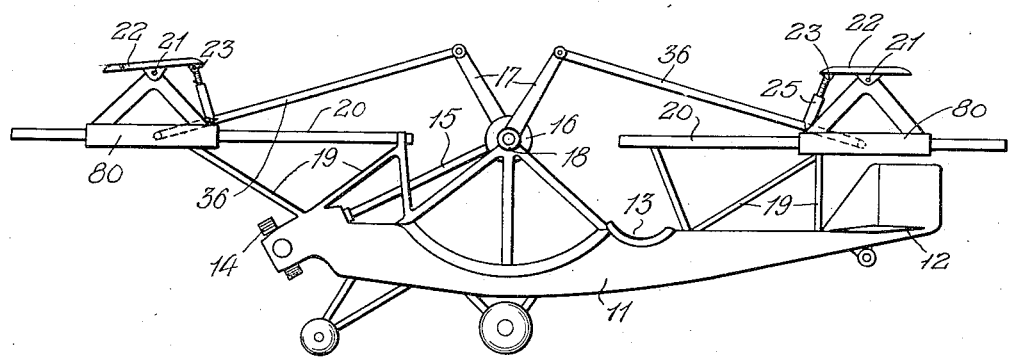
Figure 2:
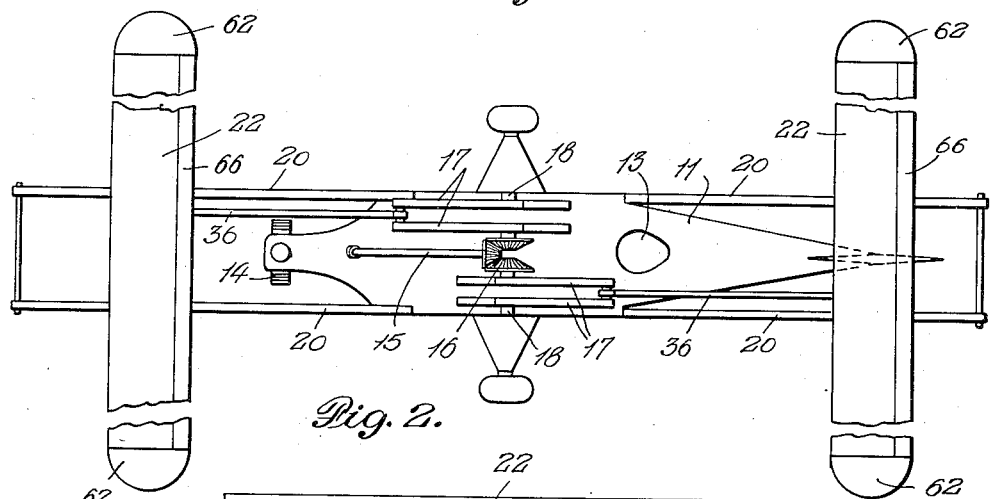
Figure 3:
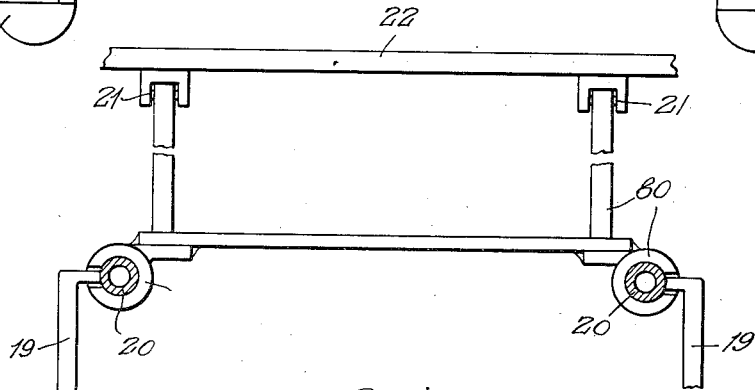

In the drawings like numerals refer to similar parts throughout the several views, of which Fig. 1 shows a side view of the flying apparatus, Fig. 2 shows a top view of the same, Fig. 3 shows a partial front view of the airfoil truck 20 of Fig. 1, and its relation to the airfoil track, Fig. 4 shows a cross section on the line 4—4 of Fig. 2 through one of the airfoils, showing the tip flaps and the manner in which they are controlled, Fig. 5 shows a cross section on the line 5—5 of Fig. 1 through one of the airfoils, showing its bottom plate, its rear flap, and the manner in which they are linked together, Fig. 6 shows in an enlarged scale the portion near the flap hinge of Fig. 5, Fig. 7 shows a partial side view of the airfoil control mechanism, Fig. 8 shows a front view of the same mechanism, Fig. 9 is a control diagram of the flying apparatus, and Fig. 10, relating back to Fig. 7, shows a top view of a portion of the connecting rod 36 and its linkage mechanism.

Turning now to Figs. 1 and 2, there is depicted a flying apparatus embodying my invention. The fuselage 11 has a landing gear, a conventional elevator and rudder unit 12 at its rear, a cockpit 13, and at its front an air cooled radial engine 14. The power generated in said engine is transmitted through a shaft 15 and a bevel gear 16 to a pair of balanced crank shafts 17, supported in bearings 18 mounted on the fuselage 11. Rigidly connected to the fuselage 11 by means of braces 19 is a pair of airfoil tracks 20. Slidably mounted on said tracks is a pair of airfoil trucks 80, linked to the crank shafts 17 by means of connecting rods 36. Hinged to trucks 80, about a pivot 21, is an airfoil 22, one on each truck. Airfoils 22 are linked at the pivot 23 to the connecting rod 36 by means of the link members 25.

Turning now to Figs. 7, 8, and 10, the last mentioned mechanisms are shown in greater detail. Bearing 26 mounted on truck 80 supports a journal carrying on one side the sprocket wheel 27 and on its other side the universal joint 28. Bearing 29, mounted on the airfoil structure 22 supports a journal, carrying on one side this universal joint 28 and on the other side the shaft 30, which shaft is further supported by the bearing 31 mounted on airfoil structure 22. Shaft 30, through the bevel gear 32 mounted on the airfoil structure 22, transmits its rotation to the universal gear 23, which gear 23 constitutes at the same time the pivot designated before by the same numeral. The rotation is further transmitted to the threaded bolt 33, in screwing mesh with the tube 34, which tube in turn is hinged to the slide 35. 35 is slidably supported by the connecting rod 36.

Bearings 37 and 38, mounted on said connecting rod, support a threaded spindle 39, in screwing mesh with slide 35. This spindle is coupled to the universal joint 40, and the latter joint at its other end to a journal in bearing 81 mounted on truck 80. The other end of this journal carries a gear wheel 42. The universal joint 28 is in axial alignment with pivot 21.

The members thus described cooperate to make the linkage between the connecting rod 36 and its airfoil 22 adjustable. In order to effectuate said adjustment during flight and oscillation of the airfoils, there are provided three square control shafts 43, 44, and 45, parallel to the tracks 19, each rotatably mounted on the fuselage 11. These square shafts pass respectively through corresponding square holes of a gear wheel 46, a sprocket wheel 47, and a lever 48, made to slide axially along their shafts by means of thrust bearings mounted on truck 80, and are in operative connection with gear wheel 42, sprocket wheel 27, and bell crank 65 respectively. Said square shafts, and thereby 46, 47, and 48, can be turned by the pilot by means of hand wheels 60 and 61 and of control stick 91. Said handwheels and stick are in fixed relation to the sprocket wheels 50 and 51, and the lever 52 respectively, which in turn by means of chains 53 and 54 and rod 55 are in operative connection respectively with sprocket wheels 92 and 93 and lever 94, fixed respectively to shafts 43, 44, and 45.

In order to obtain lateral control of the airfoils 22 in both, forward and backward motion, there are provided pairs of tip flaps 62, hinged to airfoils 22 rotatable about an axis 63 substantially parallel to the direction of flight. The deflection of these tip flaps is controlled by a rod 64, hinged to the two tip flaps, and in operative connection with rod 49 by means of the bell crank 65 mounted on the airfoil structure. This bell crank is linked to lever 47 by means of rod 49. In their neutral position, both tip flaps point partly down, as drawn in full line in Fig. 4. In their extreme controlling position, the one is in line with the airfoil, and the other is fully turned down, as drawn in dashed line in Fig. 4. The center of pressure of the airfoil lift is thereby moved sideways, and a rolling moment produced.

In order to obtain a large lifting capacity of the airfoils, each is provided with a rear flap 66, hinged to the top end of the airfoil at the pivot 67, and held in position by pins 68 fixed to the rear flaps below at their front end. These pins engage slots 69 in brackets 70 attached to bottom plates 71, which latter plates are hinged to the airfoil structure at 72 and form a portion of the bottom surface thereof. The axis of rotation about the pivots 72 is parallel to the leading edge of the airfoil. Ordinarily, the air forces tend to turn up the rear flaps 66, thereby turning bottom plate 71 into its lowest position. The wing section of the airfoil has then a contour with straight and parallel upper and lower portions 94 and 95, and moderately sharp leading and trailing edges 96, as shown in Fig. 5. When the direction of the resultant moment of the air forces on the rear flap is reversed, which happens at large incidence, this flap is depressed into the position drawn in dashed line in Fig. 5, and by virtue of its linkage with the bottom plate the latter is turned up, whereby a smooth streamlined cross section of the airfoil is obtained suitable for the production of a large lift.

For the operation of the flying apparatus, the control stick is used as in conventional airplanes. When about to take off, hand wheels 60 and 61 are turned so that the incidence of the airfoils becomes zero in their end positions and positive during the forward stroke and negative during the backward stroke. That is to say slide 35 is moved to the left hand side in Fig. 7, and the link member 25 is shortened. With the engine driving, the airfoils will then produce a powerful lift without forward motion of the apparatus, lifting it up into the air. A sufficient altitude having thus been obtained, the same hand wheels 60 and 61 are turned, so as to give to the airfoils a positive incidence during the entire stroke, that is to say, slide 25 is moved to the right hand side in Fig. 7, and the link member 25 is lengthened. The apparatus will then assume horizontal flight, the airfoils acting at the same time as lifting and as propelling members. Should the engine stall during the flight, the apparatus will assume a gentle down glide without change in the setting of the incidence control hand wheels, either with the oscillation of the airfoils discontinued, or continuing the same under the action of the air forces themselves.

I claim:

1. In a flying apparatus: a pair of airfoils adapted to be reciprocated substantially parallel to the direction of flight; adjustable means for periodically changing the incidence of said airfoils during each stroke, said change taking place gradually and during a substantial portion of the oscillation period; means for adjusting the average incidence of said airfoils; and power means for reciprocating said airfoils.

2. In a flying apparatus: a pair of airfoils adapted to be reciprocated substantially parallel to the direction of flight; means adjustable during flight for periodically changing the incidence of said airfoils during each stroke, said change taking place gradually and during a substantial portion of the oscillation period; means for adjusting during flight the average incidence of said airfoils; and power means for reciprocating said airfoils.

3. In a flying apparatus: fixed tracks substantially parallel to the direction of flight; a pair of airfoil trucks slidably mounted on said tracks; a pair of oppositely turnable cranks; a pair of connecting rods linking each truck to one of the cranks; a pair of airfoils hinged respectively to the trucks so as to permit a change of the incidence; a pair of link members connecting each airfoil with the coordinated connection rod; means for changing during flight the length of said link members and the position of their pivot relative to the connecting rod; and power means for turning said cranks.

STEFFEN P. NEMETH.